E. E. LANTZ.
SHOCK ABSORBER FOR VEHICLES.
APPLICATION FILED OCT. 11, 1907.

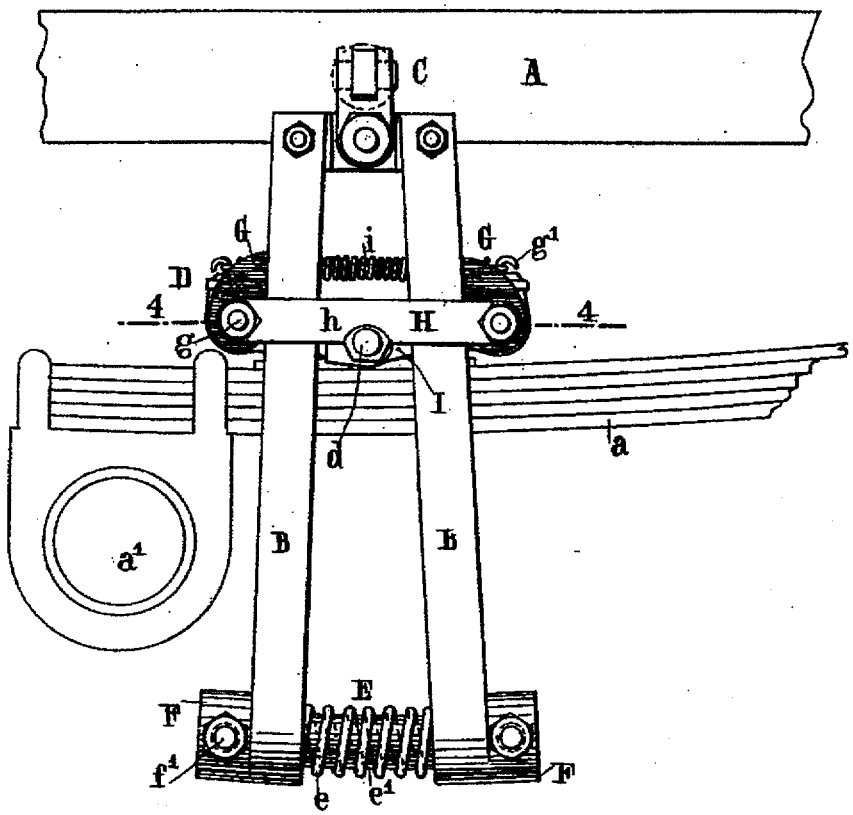
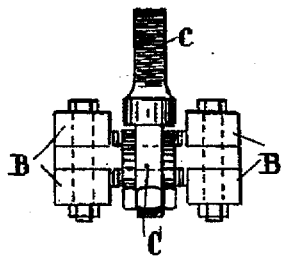

906,241.

Patented Dec. 8, 1908.

3 SHEETS—SHEET 2.

WITNESSES:
W. M. Avery
J. P. Davis

INVENTOR
Edmond Elie Lantz
BY
Munn & Co.
ATTORNEYS

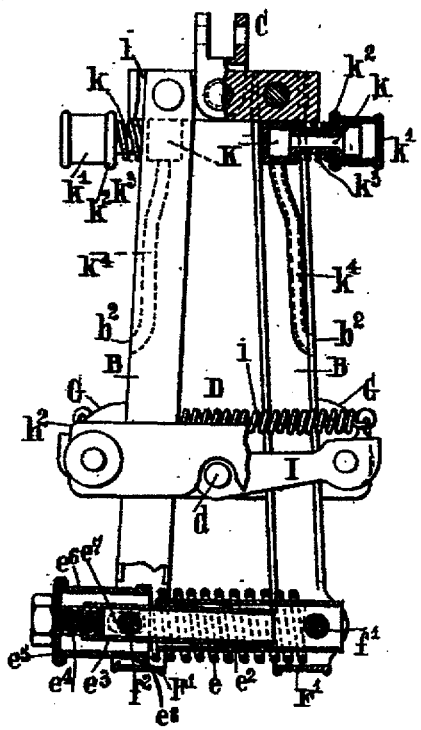
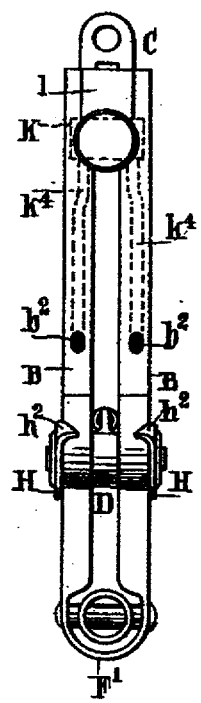

UNITED STATES PATENT OFFICE.

EDMOND ELIE LANTZ, OF PARIS, FRANCE.

SHOCK-ABSORBER FOR VEHICLES.

No. 906,241.     Specification of Letters Patent.     Patented Dec. 8, 1908.

Application filed October 11, 1907. Serial No. 396,922.

*To all whom it may concern:*

Be it known that I, EDMOND ELIE LANTZ, a citizen of the Republic of France, residing in Paris, Seine, France, manufacturer, have invented certain new and useful Improvements in Shock-Absorbers for Vehicles, of which invention the following is a full, clear, and exact description.

Shock-absorbers hitherto known all possess grave inconveniences, among which may be cited in particular (leaving aside shock-absorbers containing liquid or compressed air and therefore subject to leakage); the hard riding of the carriage; the shearing of the suspension springs; the frustration of their useful effect or sensitiveness; the necessity for continually adjusting the suspension by reason of the wear of the frictional parts; the impossibility of applying them to heavy vehicles; further, none of them is adjustable for the variable strength of springs which may consist of from five to twelve plates.

The system of shock-absorber which is the object of this invention is intended to avoid these inconveniences; it allows of all displacements and works in the same manner in all positions, even completely turned over; it is adapted to all kinds of vehicles and can be regulated for all suspension springs whatever be their strength.

The invention is shown by way of example upon the annexed drawings, in which—

Figure 3:
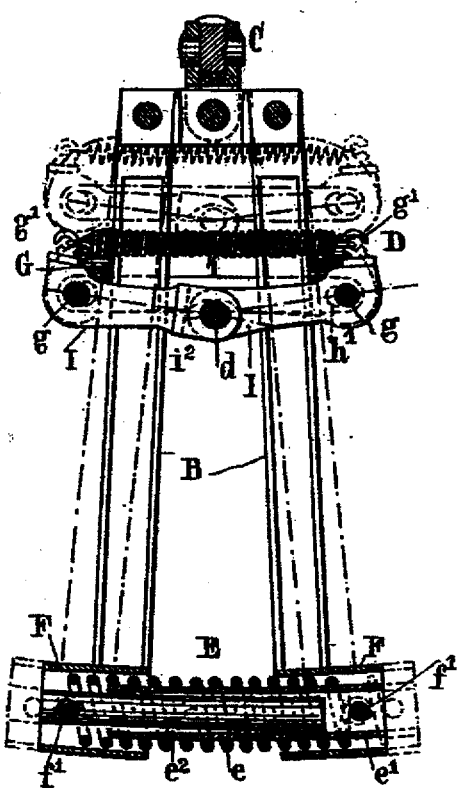
Figure 2:
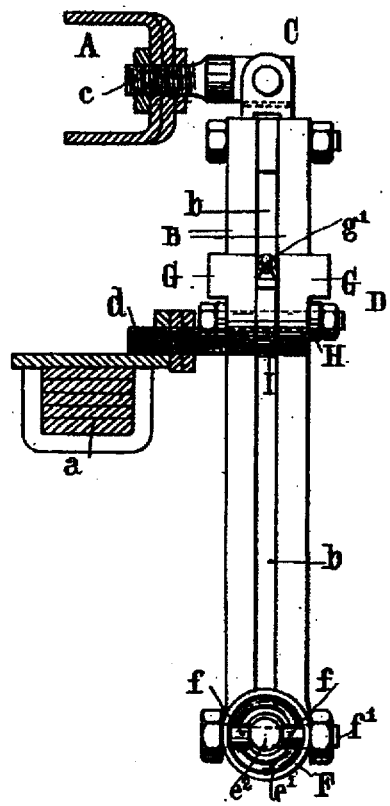
Figure 4:
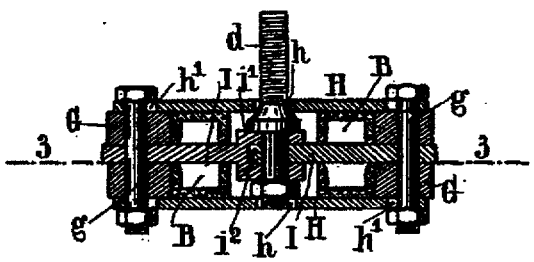
Figure 6:
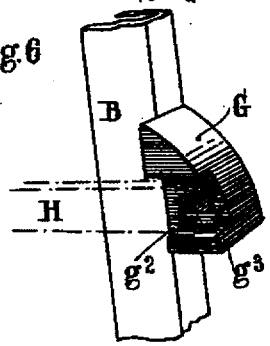

Figure 1 is a view in elevation showing the cushioning device in place upon a carriage in the working position. Fig. 2 is the corresponding side view thereof. Fig. 3 is a vertical section on line 3—3 of Fig. 4 showing the shock absorber in two different working positions. Fig. 4 is a view in horizontal section on line 4—4 of Fig. 1. Fig. 5 is a plan view of the upper part of Fig. 1. Fig. 6 shows a modification of the fiber wearing-piece. Fig. 7 shows in elevation, part section, a modified construction of the new shock-absorber and Fig. 8 is the corresponding side view.

With regard to Figs. 1 to 5, A designates the chassis of the carriage, $a$ a suspension spring and $a^1$ the axle (Fig. 1). The shock absorber is composed essentially of two longitudinal members B, preferably hollow, of a universal joint C (Figs. 1, 2, and 5), of a runner D having fiber wearing pieces, and of a separator E. As shown in Fig. 2, the members B are duplicated and separated by a space $b$. The shock-absorber is rendered fast to the chassis A by the pin or axle $c$ of the universal joint and to the suspension spring $a$ by the axle or pin $d$ of the runner D. The separator E comprises a spring $e$ threaded on a sleeve $e^1$ in which can slide, within certain limits, by the aid of a pin and a groove (not represented), a rod $e^2$. The longitudinal members B have at each of their lower extremities, a socket F forming a projection exteriorly, and furnished interiorly with two tubular nipples $f$ fast to the said sockets and traversed by bolts $f^1$ which also pass through openings for the purpose in the rod $e^2$ and the sleeve $e^1$; the extremities of the spring $e$ bear upon the nipples $f$ and the said spring tends constantly to increase the angle of the members B upon which bear the fiber wearing pieces G. The runner which is provided with these wearing pieces, to the number of four, say two to each pair of duplicated longitudinal members, comprises also two levers I, the one with a fork or female part $i^1$ and the other with a male part $i^2$ jointed upon the axle or pin $d$ and acted on by the spring $i$ which is fixed at its two extremities to the hooks $g^1$. The levers I are traversed at their outer extremity by a bolt $g$ each forming the axle of a pair of wearing pieces G. These last are eccentric in such a way that they are capable of wedging action upon the longitudinal members and the axles $g$ are linked or made fast together by the bars H recessed at $h$; the holes $h^1$ in the bars H through which the axles $g$ pass, are slightly elongated with a view to procuring a certain amount of play in relation to that of the levers I, and the spring $i$ is intended to take up the wear in the wearing pieces. According to the space available, the shock-absorber can be placed to the right or the left of the axle or in any other suitable position, provided it be connected on the one hand to the chassis by a universal joint allowing all displacements to be followed in every direction of the body of the carriage relatively to the suspension spring and connected on the other hand, to this latter by the moving part or runner forming a brake. From the foregoing it results that the cushioning of the shock is in proportion to the violence of this latter.

For a feeble shock, the cone of the longitudinal members B remains closed and that of the levers I works almost alone. The rise of the runner takes place almost instantaneously, leaving to the suspension spring of the carriage all its sensitiveness and suppleness. In a gentle shock as in a violent one, the rise takes place normally owing to the jointed levers I opening and the fiber wearing pieces G only sliding along the longitudinal members, aided by the cone of these latter which open under the action of their spring $e$. On the descent the angle of the levers I tends to close, the wearing pieces G apply themselves in a wedging manner to the longitudinal members and act as brakes; they undergo a greater strain having at the same time to reclose the cone of the longitudinal members. The more violent the shock the more the braking effect is accentuated and although the wear of the parts G is small it is automatically taken up, as has been stated, by the spring $i$. On the other hand, as it is easy to choose for each shock-absorber a spring $e$ in proportion to the suspension springs $a$, the latter can be caused to afford the whole of their useful effect without risk of shearing. Besides, Fig. 7 represents a method of tensioning the spring $e$ of the separator which enables the strength of this spring to be altered at will relatively to the strength of the suspension spring, that is to say relatively to the weight of the vehicle to which the shock-absorber is applied, and this has for advantage to allow the shock absorber to be used for any kind of vehicle without changing the spring. In order to attain this adjustable tension of the spring $e$ the solid guide rod $e^2$ of Figs. 1 to 3 is replaced by a hollow rod $e^2$ screw-threaded at $e^3$ in which engages a screw $e^4$ (Fig. 7). The head of the screw maintains in position a metal washer $e^5$ against which bears the extremity of a sleeve $e^6$; in this sleeve $e^6$ are formed two slides or slots $e^7$ through which passes the transverse rod $f^2$. One end of the spring $e$ bears against the rod $f^1$ and the other against the shoulder $e^8$ of the sleeve $e^6$.

In order to impart more or less tension to the spring $e$, it is sufficient to screw up more or less the stud $e^4$ in the hollow rod $e^2$ which thus compresses the spring $e$ to a greater or less extent by the intermediary of the washer $e^5$ and of the sleeve $e^6$ upon which this spring bears. The shock absorber may also be furnished with a lubricating device preventing heating of the different parts of which it is composed, in particular of the longitudinal members upon which the fiber wearing-pieces slide. This lubricating device may consist of a grease cup K (Figs. 7 and 8) placed at the top of the members B in the hollow provided by a U-iron forming these members; this cup K is fitted with a tube $k$ of which the outer enlarged extremity is threaded. A cap $k^1$ is screwed upon this outer part and a washer $k^2$ held by a spring $k^3$ against the cap, prevents this latter from turning freely. From the lower part of the cup chamber K proceed two pipes or passages $k^4$ which are placed within the hollow longitudinal members and these deliver each at $b^2$ $b^2$ upon the same parts or faces of the longitudinal member upon which slide the wearing pieces G of the runner D.

The lubricant is introduced in and by the hollow cap $k^1$ and a greater or less quantity thereof passes into the chamber K and into the tubes $k^4$ according to the extent to which the cap $k^1$ is screwed up on the tube $k$. Further, it is not always necessary to touch the cap $k^1$ to deliver lubricant on to the members B; the apparatus as it gets hot causes the grease to melt which then of itself runs out.

Fig. 6 shows a modification in the wearing piece G constructed in such a manner as to have a projection $g^1$ and a cut-away portion $g^2$ for the purpose of preventing the wearing piece from becoming inverted at the rear or being turned over, obliging it thus to remain continually in contact with the corresponding longitudinal member. Instead of this arrangement, abutments or stops may be formed by the lapping or flanging of a portion of the bars H. These stops preventing the inversion of the wearing pieces G, are formed upon the plates H H at a suitable height, and their upper corners are bent over at a right angle towards the interior at $h^2$ and engage a little above the wearing pieces G so as to leave the latter a certain amount of play (Figs. 7 and 8).

In the shock absorber illustrated in Figs. 7 and 8, the tubes F are dispensed with and replaced by the prolongation F¹ of the members B jointed with a U-shape; further the abutments or stops $l$ formed by the central piece upon which the members B are jointed, are placed outside these joints instead of being placed between the two axes as in Fig. 1. Finally, one can shelter each shock absorber from dust and mud by inclosing it in a casing or cover.

Having now particularly described and ascertained the nature of my said invention and in what manner the same is to be performed, I declare that what I claim is:—

1. In a shock absorber for carriages, the combination of two longitudinal opening members B pivotally connected at one of their extremities with the chassis A of the carriage, and a runner D comprising sections yieldingly connected together and slidably mounted on said members, said runner carrying wearing-pieces and connected to the suspension spring $a$ of the carriage, so that the displacements of this latter, under the influence of external shocks, effect the rise and the descent of the runner D forming a brake on the longitudinal members.

2. In a shock-absorber for carriages, the combination of two longitudinal opening members B pivotally connected at one of their extremities with the chassis A of the carriage by a universal joint C, and a runner D comprising pivoted and spring pressed sections slidably mounted on the longitudinal members, said runner carrying wearing-pieces and connected to the suspension spring $a$ of the carriage, so that the displacements of this latter, under the influence of external shocks, effect the rise and the descent of the runner D forming a brake on the longitudinal members.

3. In a shock-absorber for carriages, the combination of a pair of hollow longitudinal members B fixed at one of their extremities to the chassis A of the carriage by a universal joint C and having an automatic separator E fixed to the opposite extremity of the universal joint and tending to open the cone of the members B, upon which slides a runner D carrying wearing-pieces and connected to the suspension spring $a$ of the carriage, so that the displacements of this latter, under the influence of external shocks, effect the rise and the descent of the runner D forming a brake on the longitudinal members.

4. In a shock-absorber for carriages, the combination of a pair of hollow longitudinal members B, fixed at one of their extremities to the chassis A of the carriage, upon which slides a runner D carrying wearing pieces G set out of center and producing a wedging effect on the members B, and connected to the springs $a$ of the carriage.

5. In a shock-absorber for carriages, the combination of a pair of hollow longitudinal members B, fixed at one of their extremities to the chassis A of the carriage, upon which slides a runner D carrying wearing pieces G set out of center and producing a wedging effect on the members B, and two levers I jointed upon the axle $d$ of the runner D which connects the apparatus to the springs $a$, with a recall-spring $i$ fixed to the free extremities of the levers I in order to take up automatically the small wear in the wearing-pieces G.

6. In a shock-absorber for carriages, the combination of a pair of hollow longitudinal members B, fixed at one of their extremities to the chassis A of the carriage, upon which slides a runner D carrying wearing pieces G set out of center and producing a wedging effect on the members B, and two levers I jointed upon the axle $d$ of the runner D which connects the apparatus to the springs $a$, with a recall-spring $i$ fixed to the free extremities of the levers I in order to take up automatically the small wear in the wearing-pieces G maintained by transverse bars H which afford elongated passage holes $h^1$ for the axles $g$.

7. In a shock absorber for carriages, the combination of two longitudinal members B pivotally connected at one of their extremities with the chassis A of the carriage, a runner D slidably mounted on the said members, said runner carrying wearing-pieces and connected to the suspension spring $a$ of the carriage, so that the displacements of this latter, under the influence of external shocks, effect the rise and the descent of the runner D forming a brake on the longitudinal members, and the automatic lubricating device K, $k^4$, $k^1$ for lubricating the longitudinal members.

8. In a shock absorber for carriages, the combination of two longitudinal opening members B pivotally connected at one of their extremities with the chassis A of the carriage, a runner D slidably mounted on the longitudinal members, said runner carrying wearing-pieces and connected to the suspension spring $a$ of the carriage, so that the displacements of this latter, under the influence of external shocks, effect the rise and the descent of the runner D forming a brake on the longitudinal members, and a separator E between the longitudinal members and comprising an adjustable spring $e$.

9. In a shock absorber for carriages, the combination of two longitudinal opening members B pivotally connected at one of their extremities with the chassis A of the carriage, a runner D slidably mounted on the longitudinal members, said runner carrying wearing-pieces and connected to the suspension spring $a$ of the carriage, so that the displacements of this latter, under the influence of external shocks, effect the rise and the descent of the runner D forming a brake on the longitudinal members, the automatic lubricating device K, $k^4$, $k^1$ for the longitudinal members, and a separator E between the said members and comprising the adjustable spring $e$.

10. In a shock-absorber for carriages, the combination of a pair of hollow longitudinal members B, fixed at one of their extremities to the chassis A of the carriage, upon which slides a runner D carrying wearing pieces G set out of center and producing a wedging effect on the members B, and two levers I jointed upon the axle $d$ of the runner D which connects the apparatus to the springs $a$, with a recall-spring $i$ fixed to the free extremities of the levers I, in order to take up automatically the small wear in the wearing-pieces G maintained by transverse bars H which afford elongated passage holes $h^1$ for the axles $g$ and stops $h^2$ intended to prevent the inversion of the wearing-pieces G.

11. In a shock absorber for vehicles, pivoted and spring pressed longitudinal members, adapted to be secured to one part of the vehicle, and a runner slidably mounted on the said members and adapted to be secured to another part of the vehicle, said runner comprising sections yieldingly connected together.

12. In a shock absorber for vehicles, pivoted and spring pressed longitudinal members adapted to be secured to one part of the vehicle, and a runner slidably mounted on the said members and adapted to be secured to another part of the vehicle, said runner comprising pivoted and spring pressed sections carrying wearing pieces.

In testimony whereof I have signed my name to this specification, in the presence of two subscribing witnesses.

EDMOND ELIE LANTZ.

Witnesses:
CHARLES DORSY,
GUSTAVE DUMONT.